United States Patent Office 2,699,450
Patented Jan. 11, 1955

2,699,450 p-SEC.-BUTOXY-BENZALDEHYDE THIOSEMI-CARBAZONE

Jack Bernstein, New Brunswick, William A. Lott, Maplewood, and Frederick Y. Wiselogle, New Brunswick, N. J., assignors to Olin Mathieson Chemical Corporation, New York, N. Y., a corporation of Virginia No Drawing. Application March 14, 1952, Serial No. 276,686

1 Claim. (Cl. 260—552)

This invention relates to a substituted-benzaldehyde thiosemicarbazone and a method for the preparation thereof.

A large number of substituted-benzaldehyde thiosemicarbazones have been prepared heretofore (cf. Hoggarth et al., Brit. J. Pharmacol., 4, 248, and Domagk et al., Naturwissenschaften, 33, 315, inter alia) and screened for antituberculous activity, but these compounds (notably p-acetamido-benzaldehyde thiosemicarbazone) have failed to survive extensive clinical trial due to high toxicity. As part of this screening program, several p-(lower alkyl)-oxy-benzaldehyde thiosemicarbazones have been prepared and tested orally in mice for antituberculous activity, toxicity, etc.; but the results of tests of these compounds were not sufficiently promising to indicate that the (lower alkyl)-oxy-benzaldehyde thiosemicarbazone series should be further investigated.

Despite this contraindication, applicants have further investigated this series, and provided a novel compound, p-sec.-butoxy-benzaldehyde thiosemicarbazone, which is outstanding in the series with respect to activity and other significant factors, and is a utilizable and valuable chemotherapeutic agent, especially an antituberculous agent. As illustrative of its outstanding character, the p-sec.-butoxy compound, besides being highly effective as an antituberculous agent, is of remarkably low toxicity, and can be administered in dosages much above 100 mg., the maximum safe dose for p-acetamido-benzaldehyde thiosemicarbazone.

Following is a specific embodiment illustrative of the invention:

Example

(a) 202.4 g. sec.-butyl bromide and 40 g. sodium hydroxide are added to a solution of 122 g. p-hydroxy-benzaldehyde in 300 ml. ethanol and the resulting mixture is refluxed for 7 hours. On adding one liter of water, an oily precipitate settles out. The oil is extracted with ether, the ether extract washed with 100 ml. sodium hydroxide (10% aqueous solution), and, after the ether extract is dried by treating with anhydrous magnesium sulfate, the ether is distilled off. The residue is distilled under reduced pressure and the fraction boiling at 143–144° C. at 12—13 mm. is collected. The product, p-sec.-butoxy-benzaldehyde, is obtained in a yield of about 113 g.

(b) A solution of 36 g. of p-sec.-butoxy-benzaldehyde in one liter hot ethanol is added to a solution of 18.2 g. thiosemicarbazide in 200 ml. hot water. The oily precipitate which settles out is crystallized by trituration with 100 ml. benzene, then separated by filtration; on recrystallization from 250 ml. of 50% ethanol, pure crystals melting at 110.5–112.5° C. are obtained.

Like the compound p-acetamido-benzaldehyde thiosemicarbazone [also known as p-formyl-acetanilide thiosemicarbazone], the compound of this invention is active perorally, and may be administered in the same pharmaceutical forms, i. e., dispersed or solubilized in an aqueous medium (as an inhalation aerosol or spray), or in dosage-unit carriers of the solid type (e. g., tablets or capsules). Thus, it may be incorporated in gelatin capsules each containing of the order of 25–200 mg. of the product. Alternatively, tablets containing of the order of 25–200 mg. of the compound of this invention may be formed by preparing a granulation of the compound with such binders as acacia, lactose and starch [i. e., moistening, adding one or more of these binders, drying, screening, and adding a lubricant, such as stearic acid powder], and compressing the granulation into tablets each containing the selected dosage.

The compound of this invention is also useful as an environmental antituberculous agent, e. g., in hospital and dairy sanitation. For this purpose, it is incorporated in the usual carriers, e. g., aerosols and detergent solutions.

The invention may be variously otherwise embodied within the scope of the appended claim.

We claim:

p-Sec.-butoxy-benzaldehyde thiosemicarbazone.

References Cited in the file of this patent

Behnisch et al., "Angewandte Chemie," vol. 60, May 1948, p. 114.

Hoggarth et al., "Br. J. Pharmacol," vol. 4 (1949), pp. 248 and 249.

Donovick et al., "J. Bacteriology," vol. 59 (1950), p. 670.

Bernstein, Yale, Losee, Holsing, Martins and Lott, "J. Am. Chem. Soc.," vol. 73, Mar. 1951, pp. 906–8.